United States Patent
Lee et al.

(10) Patent No.: US 7,282,694 B2
(45) Date of Patent: Oct. 16, 2007

(54) OPTICAL NAVIGATION SYSTEM HAVING A RING PIXEL ARRAY

(75) Inventors: Chin Yun Lee, Penang (MY); Sai Mun Lee, Penang (MY); Tony Sen Liew, Perak (MY); Shan Chong Tan, Selangor (MY); Bernard Lye Hock Chan, Penang (MY)

(73) Assignee: Avago Technologies ECBU IP (Singapore) Pte Ltd, Singapore (SG)

( * ) Notice: Subject to any disclaimer, the term of this patent is extended or adjusted under 35 U.S.C. 154(b) by 0 days.

(21) Appl. No.: 11/013,982

(22) Filed: Dec. 15, 2004

(65) Prior Publication Data

US 2006/0124839 A1    Jun. 15, 2006

(51) Int. Cl.
*G06M 7/00* (2006.01)
*H01J 40/14* (2006.01)

(52) U.S. Cl. .................................. 250/221; 345/166
(58) Field of Classification Search ............... 345/163, 345/166, 157, 160, 161, 158, 175; 250/208.1, 250/208.2, 221, 222.1; 382/313, 321
See application file for complete search history.

(56) References Cited

U.S. PATENT DOCUMENTS

| | | | | |
|---|---|---|---|---|
| 5,943,233 A | * | 8/1999 | Ebina et al. | 700/85 |
| 6,424,407 B1 | * | 7/2002 | Kinrot et al. | 356/28 |
| 6,535,694 B2 | * | 3/2003 | Engle et al. | 396/263 |
| 6,853,366 B2 | * | 2/2005 | Bowen | 345/163 |
| 2002/0093486 A1 | * | 7/2002 | Gordon et al. | 345/166 |
| 2003/0076507 A1 | * | 4/2003 | Ito | 356/499 |
| 2004/0206894 A1 | * | 10/2004 | Oka et al. | 250/231.13 |
| 2005/0163509 A1 | * | 7/2005 | Kobayashi et al. | 398/132 |

FOREIGN PATENT DOCUMENTS

WO    WO 0141502 A1 *  6/2001

* cited by examiner

*Primary Examiner*—Georgia Epps
*Assistant Examiner*—Suezu Ellis

(57) ABSTRACT

An optical navigation system having an optical navigation integrated circuit ("navigation IC") is described. The optical navigation system may include an emitter module and a pixel array surrounding the emitter module. The optical navigation system may further include a ring optical system located on the surface of the navigation IC over the pixel array.

17 Claims, 5 Drawing Sheets

OPTICAL NAVIGATION SYSTEM HAVING A RING PIXEL ARRAY

BACKGROUND OF THE INVENTION

Non-mechanical tracking devices, such as computer mice, are quickly growing in popularity worldwide. Many of these non-mechanical tracking devices utilize optical navigation technology that measures the changes in position of the non-mechanical tracking devices by optically acquiring sequential surface images and mathematically determining the direction and magnitude of the movement.

As an example, in a non-mechanical tracking device such as an optical mouse, optical navigation technology involves capturing an image and then analyzing and tracking the motion of microscopic texture or other features on a surface under the optical mouse. In general, these types of optical mice depend on tracking surface detail and most work surfaces are microscopically textured. When these surface textures are illuminated by a light source such as a light emitting diode ("LED"), a pattern of highlights and shadows is revealed. Optical mice then "watch" these surface details move by imaging them onto navigation integrated circuits ("navigation ICs").

In FIG. 1, an example of an implementation of a known non-mechanical device 100 is shown above a navigation surface 102. The non-mechanical device 100 may include an optical navigation IC 104, an emitter module 106 and a collimating system 108. The optical navigation IC 104 may include a pixel array 110. The emitter module 106 may include a light source (not shown) such as one or more LEDs and the pixel array 110 may include a plurality of photo-detectors (not shown) such as photo-diodes. The collimating system 108 may include optics, such as lens, capable of collimating received optical radiation into a collimated beam of optical radiation.

In an example of operation, the emitter module 106 may emit emitted optical radiation 112 at the navigation surface 102 at a predetermined angle 114. The emitted optical radiation 112 is then reflected by the navigation surface 102 resulting in reflected optical radiation 116 that is received by the collimating system 108. The collimating system 108 then collimates the received reflected optical radiation 116 into a collimated beam 120 of optical radiation that is passed to the pixel array 110.

Unfortunately, the optical navigation IC 104 and emitter module 106 are not integrated into a single component such as a single IC or wafer, which results in high costs of manufacture for the non-mechanical device 100 and yield issues relating to integrating separate subcomponents. Therefore, there is a need for a system and method capable of integrating the emitter module 106 and pixel array 110 into a single IC. The benefit is more obvious for a laser based illumination system because of the nature of the collimated light source and the steep angle requirement from the light source to the sensor.

SUMMARY

An optical navigation system having an optical navigation integrated circuit ("navigation IC") is described. The optical navigation system may include an emitter module and a pixel array surrounding the emitter module. The emitter module may include at least one light source configured to emit emitted optical radiation at a navigation surface. The pixel array may include a plurality of photo-detectors configured to receive received optical radiation reflected from the navigation surface, wherein the received optical radiation is a portion of the emitted optical radiation reflected by the navigation surface. The optical navigation system may further include a ring optical system located on the surface of the navigation IC over the pixel array. The ring optical system may be configured to collimate reflected optical radiation into a collimated beam of optical radiation, where the reflected optical radiation is a portion of the emitted optical radiation reflected towards the pixel array by the navigation surface.

In an example of operation, the optical navigation system performs a process for navigating the optical navigation system on a navigation surface. The process may include emitting emitted optical radiation from an emitter module to the navigation surface and receiving reflected optical radiation from the navigation surface at a pixel array surrounding the emitter module. The sub-process of receiving reflected optical radiation may include collimating the reflected optical radiation into a collimated beam of optical radiation and receiving the collimated beam of optical radiation at the pixel array, where the reflected optical radiation is a portion of the emitted optical radiation reflected towards the pixel array by the navigation surface.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description, reference is made to the accompanying drawings that form a part hereof, and which show, by way of illustration, a specific embodiment in which the invention may be practiced. Other examples of implementation may be utilized and structural changes may be made without departing from the scope of the present invention.

Figure 1:
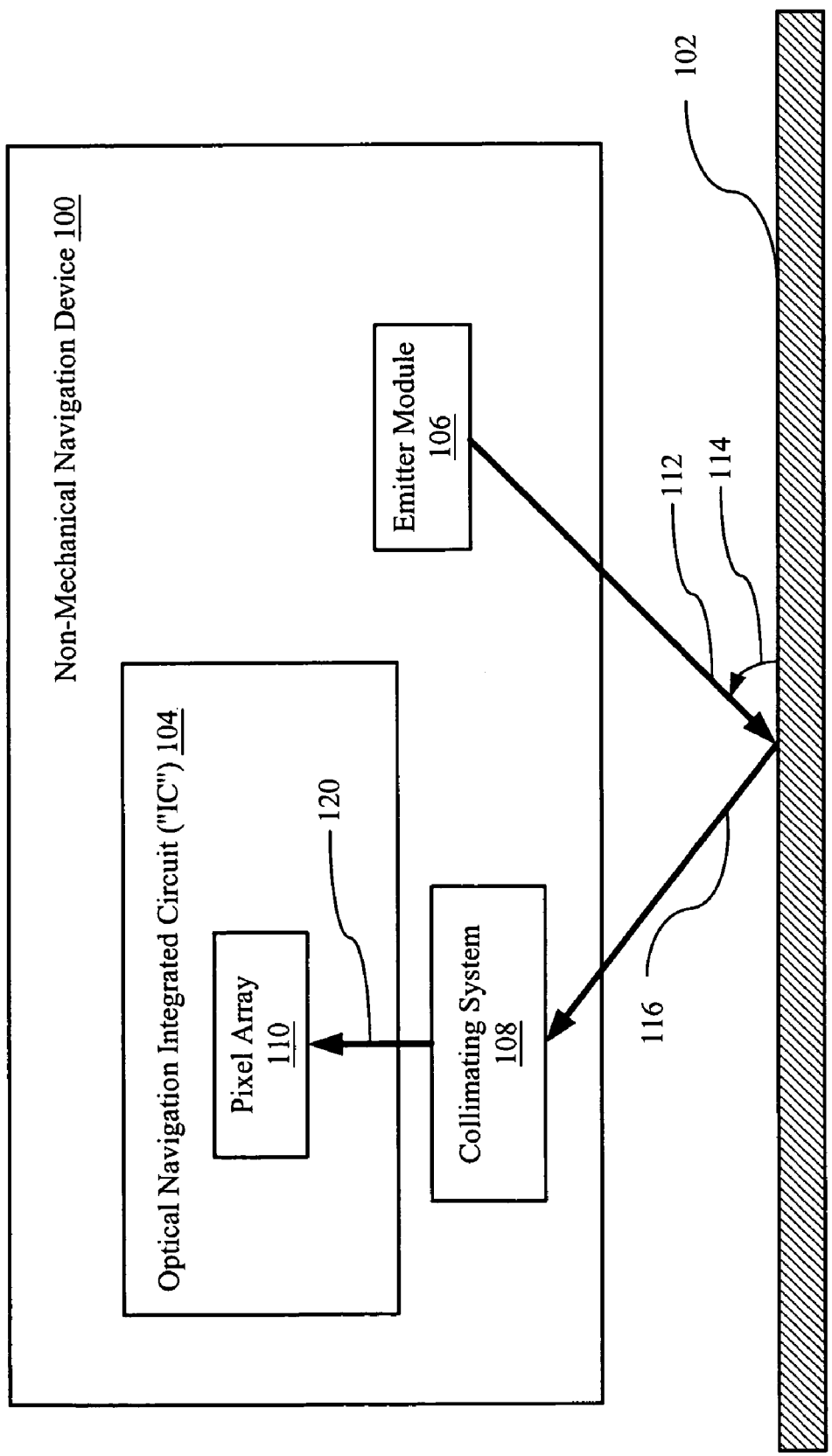
FIG. 1 is a block diagram side view of an example of an implementation of a known non-mechanical navigation device.
Figure 2:
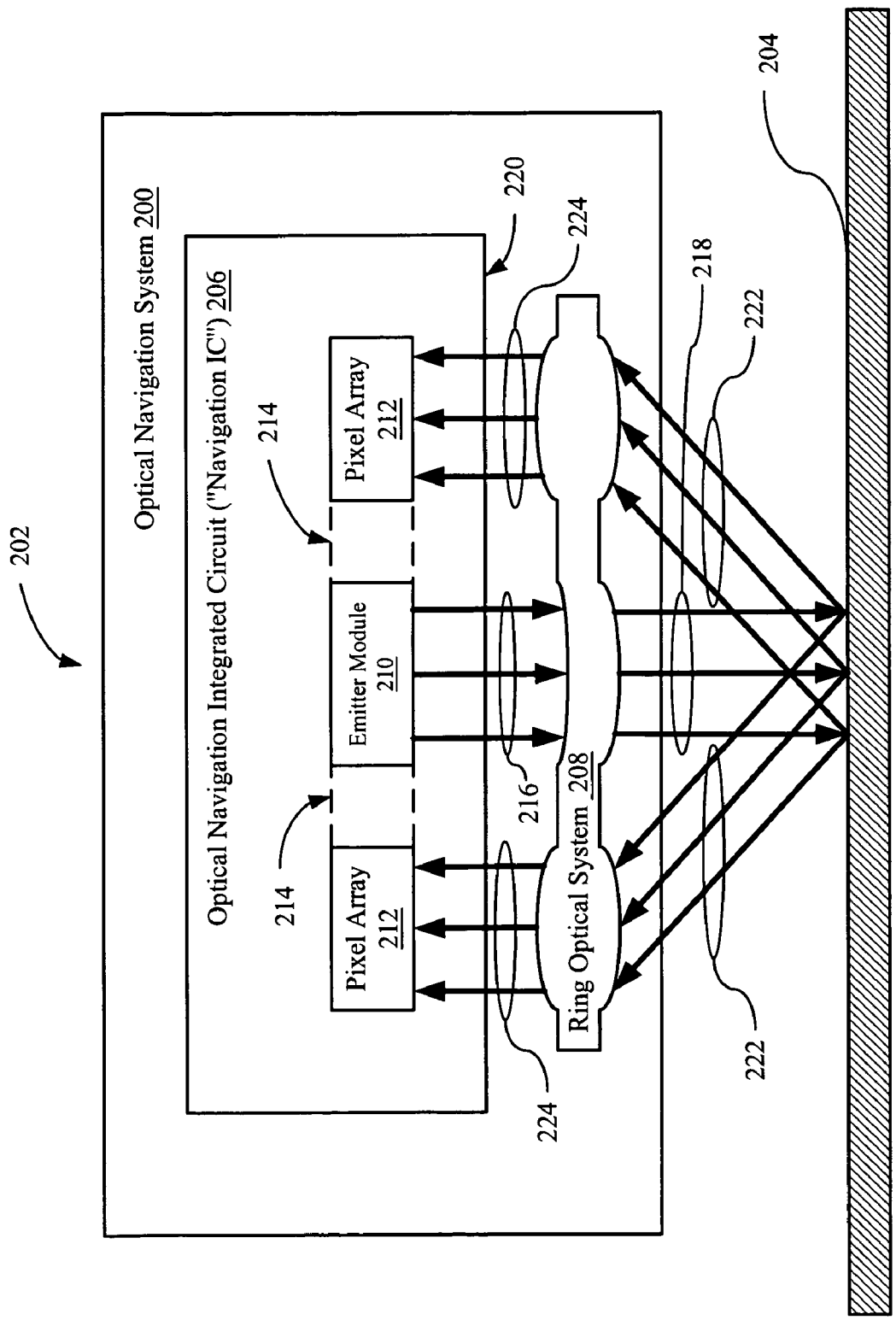
FIG. 2 is a block diagram side view of an example of an implementation of an optical navigation system within a non-mechanical navigation device.

In FIG. 2, a block diagram of a side view an example of an implementation of an optical navigation system 200 within a non-mechanical navigation device 202 is shown above a navigation surface 204. The optical navigation system 200 may include an optical navigation integrated circuit ("navigation IC") 206 and a ring optical system 208. The navigation IC 206 may include an emitter module 210 and a pixel array 212. The navigation IC 206 may include a substrate that may be a single semiconductor substrate in an integrated circuit, a lead-frame, an insert-molded lead-frame, a printed circuit board ("PCB"), flexible circuit, ceramics substrate or micro-interconnecting device ("MID").

The emitter module 210 may include a light source (not shown) such as one or more light emitting diodes ("LEDs"), and the pixel array 212 may include a plurality of photo-detectors (not shown) such as photo-diodes. The pixel array 212 is configured within the navigation IC 206 in a ring shape that has a pixel array ring interior 214 that surrounds the emitter module 210. The ring shape may be any shape such as, for example, ring shapes that are rectangular, circular or elliptical.

The ring optical system 208 may include optics, such as lens, capable of collimating received optical radiation into a collimated beam of optical radiation that is passed to the pixel array 212. The ring optical system 208 may include epoxy or other types of transmissive material and may be a shape capable of properly covering the pixel array 212. The ring optical system 208 may also be capable of directing emitted optical radiation 216 from the emitter module 210 into a focused emitted optical radiation 218 that may be directed to the navigation surface 204.

The ring optical system 208 may be a transmissive layer capable of covering both the emitter module 210 and pixel array 212, where the transmissive layer may include any transmissive and moldable material capable of collimating the emitted optical radiation 216 into a parallel beam of focused optical radiation 218 directed from the emitter module 210 to the navigation surface 204 and collimating the reflected optical radiation 222 into a collimated beam 224 of optical radiation that is passed to the pixel array 212. As an example of implementation, the transmissive layer may be an epoxy layer.

The emitter module 210 may include additional optics (not shown) capable of producing the emitted optical radiation 216 from the emitter module 210 to the ring optical system 208. The emitter module 210 may include a light source (not shown) such as a diode, photo-diode, LED, light bulb, or a semiconductor laser such as an edge-emitting laser or a Vertical Cavity Semiconductor Emitting Laser ("VCSEL"). The pixel array 212 may include an array of photo-detectors (not shown) such as photo-diodes, photo-cathodes, or photo-multipliers. It is appreciated by those skilled in the art that the optical radiation again may be visible, infrared, and/or ultraviolet light radiation, and/or may be x-ray radiation.

In an example of operation, the emitter module 210 may emit the emitted optical radiation 216 at the navigation surface 204 through the ring optical system 208. The ring optical system 208 may focus the emitted optical radiation 216 into focused emitted optical radiation 218 that is emitted in a direction that is normal (i.e., perpendicular) to the face 220 of the navigation IC 206.

The focused emitted optical radiation 218 is then reflected by the navigation surface 204 resulting in reflected optical radiation 222 that is received by the ring optical system 208. The ring optical system 208 then collimates the received reflected optical radiation 222 into a collimated beam 224 of optical radiation that is passed to the pixel array 212 which receives the collimated beam 224. The collimated beam 224 may be tubular in shape.

Figure 3:
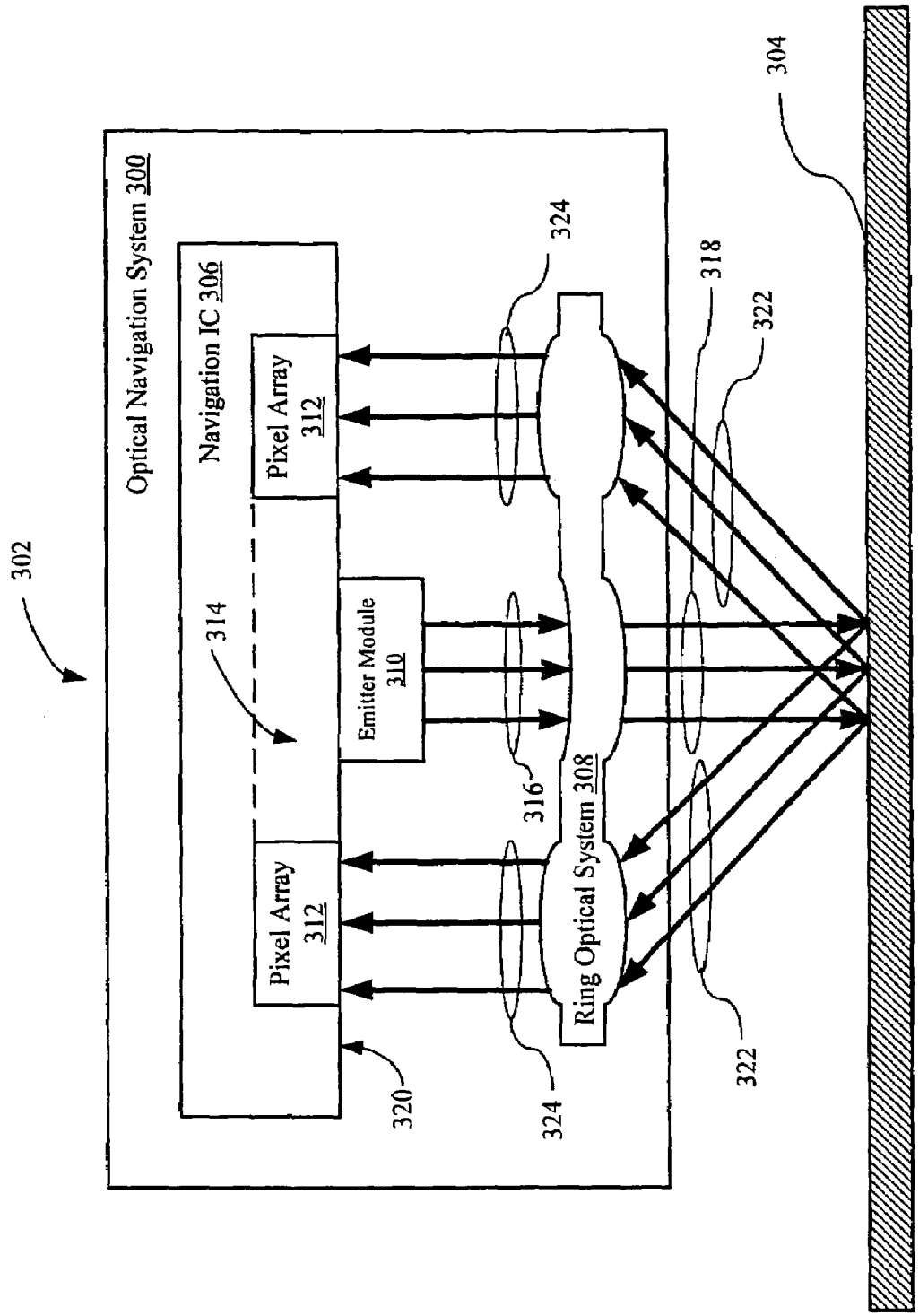
FIG. 3 is a block diagram side view of an example of another implementation of an optical navigation system within a non-mechanical navigation device.

In FIG. 3, a block diagram of a side view of an example of another implementation of an optical navigation system 300 within a non-mechanical navigation device 302 is shown. Similar to FIG. 2, the optical navigation system 300 may include an optical navigation IC 306 and a ring optical system 308. The navigation IC 306 may also include an emitter module 310 and a pixel array 312. The navigation IC 306 may include a substrate that may be a single semiconductor substrate in an integrated circuit, a lead-frame, an insert-molded lead-frame, a PCB, flexible circuit, ceramics substrate or MID.

The emitter module 310 may include a light source (not shown) such as one or more LEDs and the pixel array 312 may include a plurality of photo-detectors (not shown) such a photo-diodes. The pixel array 312 is configured within the navigation IC 306 in a ring shape that has a pixel array ring interior 314 that surrounds the emitter module 310. The ring shape may be any shape such as, for example, ring shapes that are rectangular, circular or elliptical.

The ring optical system 308 may include optics, such as lens, capable of collimating received optical radiation into a collimated beam of optical radiation that is passed to the pixel array 312. The ring optical system 308 may include epoxy or other types of transmissive material and may be a shape capable of properly covering the pixel array 312. The ring optical system 308 may also be capable of directing emitted optical radiation 316 from the emitter module 310 into a focused emitted optical radiation 318 that may be directed to the navigation surface 304.

Again, the ring optical system 308 may be a transmissive layer capable of covering both the emitter module 310 and pixel array 312, where the transmissive layer may include any transmissive and moldable material capable of collimating the emitted optical radiation 316 into a parallel beam of focused optical radiation 318 directed from the emitter module 310 to the navigation surface 304 and collimating the reflected optical radiation into a collimated of beam of optical radiation that is passed to the pixel array 312. As an example of implementation, the transmissive layer may be an epoxy layer.

The emitter module 310 may include additional optics (not shown) capable of producing the emitted optical radiation 316 from the emitter module 310 to the ring optical system 308. Again, the emitter module 310 may include a light source (not shown) such as a diode, photo-diode, LED, light bulb, or a semiconductor laser such as an edge-emitting laser or a VCSEL. Unlike FIG. 2, in FIG. 3, the emitter module 310 is not located within the navigation IC 302 but is instead located on the IC surface 320 of the navigation IC 302. The pixel array 312 may include an array of photo-detectors (not shown) such as photo-diodes, photo-cathodes, or photo-multipliers. It is again appreciated that the optical radiation again may be visible, infrared, and/or ultraviolet light radiation, and/or may be x-ray radiation.

Similar to FIG. 2, in an example of operation, the emitter module 310 may emit the emitted optical radiation 316 at the navigation surface 304 through the ring optical system 308. The ring optical system 308 may focus the emitted optical radiation 316 into focused emitted optical radiation 318 that is emitted in a direction that is normal to the IC face 320.

The focused emitted optical radiation 318 is then reflected by the navigation surface 304 resulting in reflected optical radiation 322 that is received by the ring optical system 308. The ring optical system 308 then collimates the received reflected optical radiation 322 into a collimated beam 324 of optical radiation that is passed to the pixel array 312 which receives the collimated beam 324. The collimated beam 324 may be tubular in shape.

Figure 4:
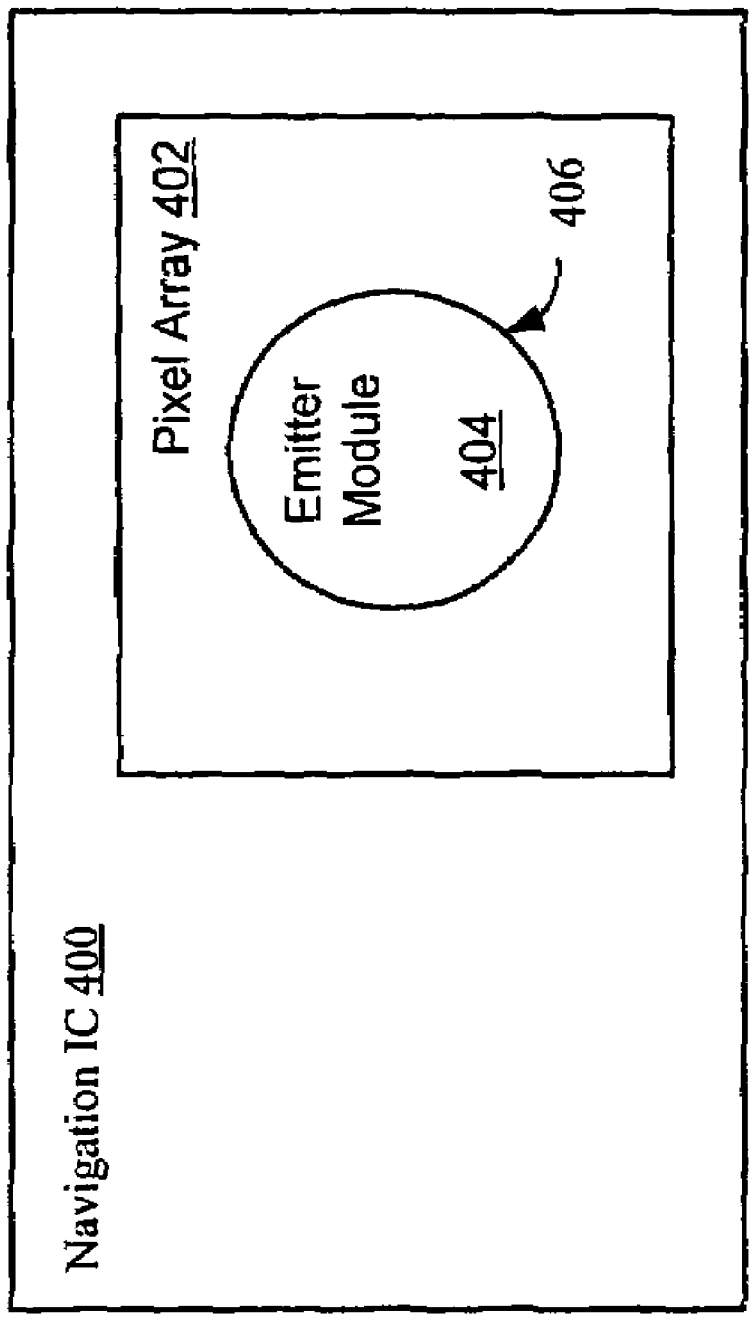
FIG. 4 is a top view of an example of an implementation of an optical navigation integrated circuit ("navigation IC") shown in both FIG. 2 and FIG. 3.

In FIG. 4, a top view of an example of an implementation of the navigation IC 400 shown in either FIG. 2 or FIG. 3 is shown. As stated above, the navigation IC 400 may include a pixel array 402 and an emitter module 404. The pixel array 402 is configured within the navigation IC 400 in a ring shape that has a pixel array ring interior 406 that surrounds the emitter module 404. The ring shape may be any shape such as, for example, ring shapes that are rectangular, circular or elliptical.

Figure 5:
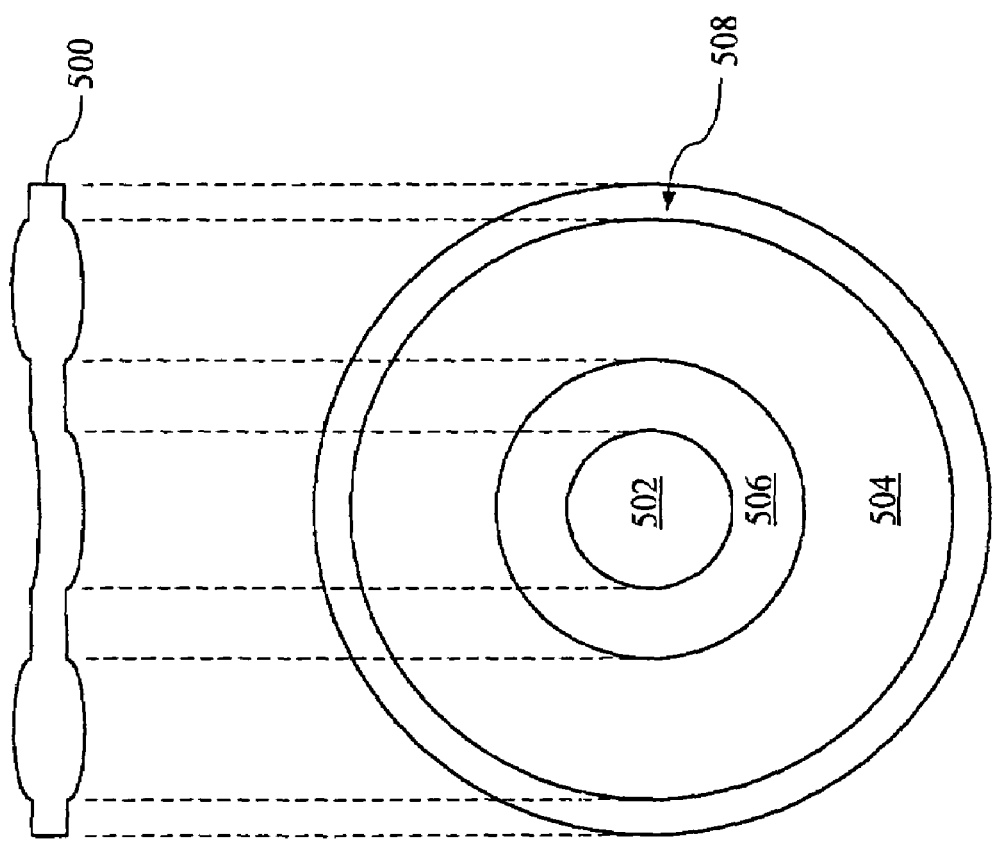
FIG. 5 is a top view of an example of an implementation of a ring optical system shown in both FIGS. 2 and 3.

In FIG. 5, a top view of an example of an implementation of a ring optical system 500 shown in either FIGS. 2 or 3 is shown. The ring optical system 500 may include a plurality of rings of optics located on the IC surface (not shown) of the navigation IC (not shown). As an example, ring 502 may be located on top of the emitter module (not shown) and it may include optics capable of collimating the emitted optical radiation from the emitter module into a parallel beam of focused optical radiation. Ring 504 may be located on top of the pixel array (not shown) and it may include optics capable of collimating received optical radiation into a collimated beam of optical radiation that is passed to the pixel array (not shown). The ring optical system 500 may include optics, such as lens, capable of collimating the reflected optical radiation into a collimated beam of optical radiation that is passed to the pixel array. Rings 506 and 508 may be transmissive layers or opaque layers that isolate ring 502 from ring 504.

It will be understood that the foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed:

1. An optical navigation system, comprising:
an optical navigation integrated circuit;
an emitter module including at least one light source configured to emit optical radiation toward a navigation surface;
a pixel array surrounding the emitter module, said pixel array having a plurality of photo-detectors configured to receive optical radiation reflected by the navigation surface, and wherein the received optical radiation is a portion of the emitted optical radiation reflected by the navigation surface; and
a ring optical system located on the surface of the optical navigation integrated circuit over the pixel array,
wherein the ring optical system is configured to collimate reflected optical radiation into a collimated beam of optical radiation, and
wherein the reflected optical radiation is a portion of the emitted optical radiation reflected toward the pixel array by the navigation surface.

2. The optical navigation system of claim 1, wherein the plurality of photo-detectors are configured to receive the collimated beam of optical radiation.

3. The optical navigation system of claim 2, wherein at least one light source is chosen from a group consisting of at least one diode, light emitting diode, photo-cathode, laser, and light bulb.

4. The optical navigation system of claim 3, wherein the photo-detectors are chosen from a group consisting of photo-diodes, photo-cathodes, and photo-multipliers.

5. The optical navigation system of claim 4, wherein the light source is configured to emit optical radiation in wavelength range chosen from a group consisting of visible light, infrared light, ultraviolet, and x-ray radiation.

6. The optical navigation system of claim 5, wherein the laser is a Vertical Cavity Semiconductor Emitting Laser.

7. The optical navigational system of claim 5, wherein the optical navigation system is located within a computer mouse.

8. The optical navigational system of claim 5, wherein the emitter module and pixel array are located within the optical navigation integrated circuit.

9. The optical navigational system of claim 5, wherein the emitter module is located on a surface of the optical navigation integrated circuit and the pixel array is located within the optical navigation integrated circuit.

10. A method for using a navigation system, the method comprising:
emitting optical radiation from an emitter module to a navigation surface;
receiving reflected optical radiation from the navigation surface at a pixel array surrounding the emitter module; and
utilizing reflected optical radiation to detect navigation of an optical navigation system on the navigation surface;
wherein receiving reflected optical radiation further includes:
collimating the reflected optical radiation into a collimated beam of optical radiation; and
receiving the collimated beam of optical radiation at the pixel array, wherein the reflected optical radiation is a portion of the emitted optical radiation reflected toward the pixel array by the navigation surface.

11. An optical navigation system, comprising:
an optical navigation integrated circuit;
means for emitting optical radiation including at least one light source configured to emit optical radiation toward a navigation surface;
a pixel array surrounding the means for emitting optical radiation, the pixel array including a plurality of photo-detectors configured to receive optical radiation reflected from the navigation surface; and
means for collimating reflected optical radiation into a collimated beam of optical radiation, wherein the reflected optical radiation is a portion of the emitted optical radiation reflected toward the pixel array by the navigation surface.

12. The optical navigation system of claim 11, wherein the plurality of photo-detectors are configured to receive the collimated beam of optical radiation.

13. The optical navigation system of claim 12, wherein the at least one light source is chosen from a group consisting of at least one diode, light emitting diode, photo-cathode, laser, and light bulb, wherein the photo-detectors are chosen from a group consisting of photo-diodes, photo-cathodes, and photo-multipliers, and wherein the light source is configured to emit optical radiation in wavelength range chosen from a group consisting of visible light, infrared light, ultraviolet, and x-ray radiation.

14. An optical navigation system, comprising:
an optical navigation integrated circuit;
an emitter module;
a pixel array surrounding the emitter module; and a ring optical system including a first optical element optically aligned with the emitter module for receiving optical radiation from the emitter module and a second optical element optically aligned with the pixel array for directing optical radiation to the pixel array.

15. The optical navigation system of claim 14, wherein the second optical element is coaxially disposed about the first optical element.

16. The optical navigation system of claim 14, wherein the first optical element is integrally formed with the second optical element.

17. The optical navigation system of claim 14, wherein the pixel array includes a plurality of photo-detectors arranged in a ring shape surrounding the emitter module.

* * * * *